(12) United States Patent  
Nishimura

(10) Patent No.: US 10,619,073 B2  
(45) Date of Patent: Apr. 14, 2020

(54) FILM-FORMING COMPOSITION FOR INK-JET COATING

(71) Applicant: NISSAN CHEMICAL INDUSTRIES, LTD., Tokyo (JP)

(72) Inventor: Naoya Nishimura, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 64 days.

(21) Appl. No.: 15/580,179

(22) PCT Filed: Jun. 1, 2016

(86) PCT No.: PCT/JP2016/066127  
§ 371 (c)(1),  
(2) Date: Dec. 6, 2017

(87) PCT Pub. No.: WO2016/199630  
PCT Pub. Date: Dec. 15, 2016

(65) Prior Publication Data  
US 2018/0134916 A1 May 17, 2018

(30) Foreign Application Priority Data  
Jun. 9, 2015 (JP) .................. 2015-116371

(51) Int. Cl.  
*C09D 179/04* (2006.01)  
*G02B 5/00* (2006.01)  
*C08G 73/02* (2006.01)  
*C08G 73/06* (2006.01)  
*C09D 7/20* (2018.01)  
*B41M 5/00* (2006.01)

(52) U.S. Cl.  
CPC ......... *C09D 179/04* (2013.01); *B41M 5/0023* (2013.01); *C08G 73/0273* (2013.01); *C08G 73/065* (2013.01); *C08G 73/0644* (2013.01); *C09D 7/20* (2018.01); *G02B 5/00* (2013.01); *C08G 73/026* (2013.01)

(58) Field of Classification Search  
CPC ...... C09D 179/04; C09D 7/20; C08G 73/065; B41M 5/0023  
USPC ........................................................ 524/377  
See application file for complete search history.

(56) References Cited

U.S. PATENT DOCUMENTS

| 2009/0239045 A1 | 9/2009 | Kato et al. |
| 2012/0049308 A1* | 3/2012 | Nishimura ......... C08G 73/0273 257/432 |
| 2015/0094420 A1* | 4/2015 | Nishimura ........... C09D 179/04 524/612 |

FOREIGN PATENT DOCUMENTS

| JP | 2013-136784 A | 7/2013 |
| JP | 2014-177505 A | 9/2014 |
| WO | WO 2010/128661 A1 | 11/2010 |
| WO | WO 2012/057104 A1 | 5/2012 |
| WO | WO 2013/168787 A1 | 11/2013 |

OTHER PUBLICATIONS

International Search Report (PCT/ISA/210) issued in PCT/JP2016/066127, dated Aug. 2, 2016.  
Written Opinion (PCT/ISA/237) issued in PCT/JP2016/066127, dated Aug. 2, 2016.

* cited by examiner

*Primary Examiner* — Hui H Chin  
(74) *Attorney, Agent, or Firm* — Birch, Stewart, Kolasch & Birch, LLP

(57) ABSTRACT

A film-forming composition for ink-jet coating which comprises: a triazine-ring-containing polymer including, for example, the repeating unit structure represented by the following formula [3]; and an organic solvent comprising more than 50 mass % solvent based on a glycol dialkyl ether. The composition is less apt to corrode the heads of ink-jet coating devices, and droplets thereof are satisfactorily ejected in ink-jet coating. Therefore, with the composition, it is possible to easily produce a high-refractive-index film according to a desired pattern through pattern printing by an ink-jet coating device.

[3]

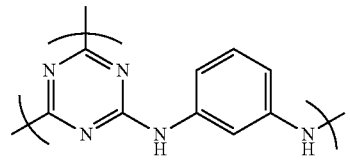

14 Claims, No Drawings

FILM-FORMING COMPOSITION FOR INK-JET COATING

TECHNICAL FIELD

The present invention relates to a film-forming composition for ink-jet coating. More specifically, the invention relates to a film-forming composition for ink-jet coating which includes a triazine ring-containing polymer and a given organic solvent.

BACKGROUND ART

In recent years, a need has arisen for high-performance polymeric materials in the development of electronic devices such as liquid-crystal displays, organic electroluminescent (EL) displays, touch panels, optical semiconductor (LED) devices, solid-state image sensors, organic thin-film solar cells, dye-sensitized solar cells and organic thin-film transistors (TFT).

The specific properties desired of such materials include: (1) heat resistance, (2) transparency, (3) high refractive index, (4) high solubility, (5) low volume shrinkage, (6) high moisture resistance at high temperatures, and (7) high film hardness.

The inventor and others earlier discovered that polymers containing recurring units which have a triazine ring and an aromatic ring possess a high refractive index and are able, with the polymer alone, to achieve a high heat resistance, high transparency, high refractive index, high solubility and low volume shrinkage, thus making such polymers suitable as film-forming compositions in the fabrication of electronic devices (Patent Document 1).

In regards to the production of spacers, insulating films, protective films and the like in liquid-crystal display elements, thin-film formation is carried out by coating methods using compositions of a high-refractive-index material dissolved in an organic solvent.

An ink-jet coater is sometimes employed at the time because patterned coating only on desired regions is possible with such a coater.

The head of this ink-jet coater tends to be attacked by organic solvents, and so there are limitations on the solvents that may be used in preparing the composition. Also, given the necessity during coating for the composition to be ejected from the head as tiny droplets, there are also limitations in terms of the viscosity and surface tension of the composition.

PRIOR ART DOCUMENTS

Patent Documents

Patent Document 1: WO 2010/128661

SUMMARY OF THE INVENTION

Problems to be Solved by the Invention

It is therefore an object of the invention to provide a film-forming composition for ink-jet coating which does not readily erode the head of an ink-jet coater, droplets of which are ejected well during ink-jet coating, and which is capable of forming a thin film of high refractive index and excellent transparency.

Means for Solving the Problems

The inventor has conducted extensive investigations in order to achieve these objects, discovering as a result that by using, as the solvent for dissolving a triazine ring-containing polymer, an organic solvent that contains a given proportion of a glycol dialkyl ether-type solvent, there can be obtained a film-forming composition which does not readily erode the head of an ink-jet coater and droplets of which are ejected well from the ink-jet coater head.

Accordingly, the invention provides:

1. A film-forming composition for ink-jet coating, comprising:

a triazine ring-containing polymer containing a recurring unit structure of formula (1) below

[Chemical Formula 1]

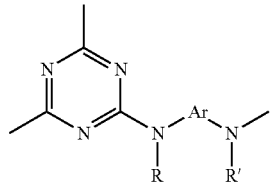

(1)

(wherein R and R' are each independently a hydrogen atom, an alkyl group, an alkoxy group, an aryl group or an aralkyl group; and Ar is at least one moiety selected from the group consisting of moieties of formulas (2) to (13)

[Chemical Formula 2]

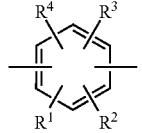

(2)

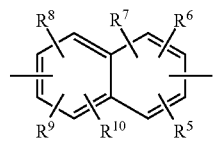

(3)

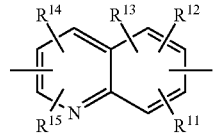

(4)

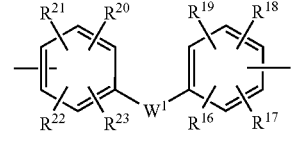

(5)

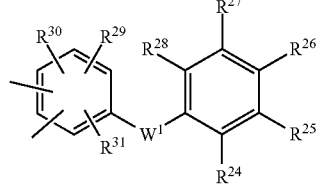

(6)

-continued

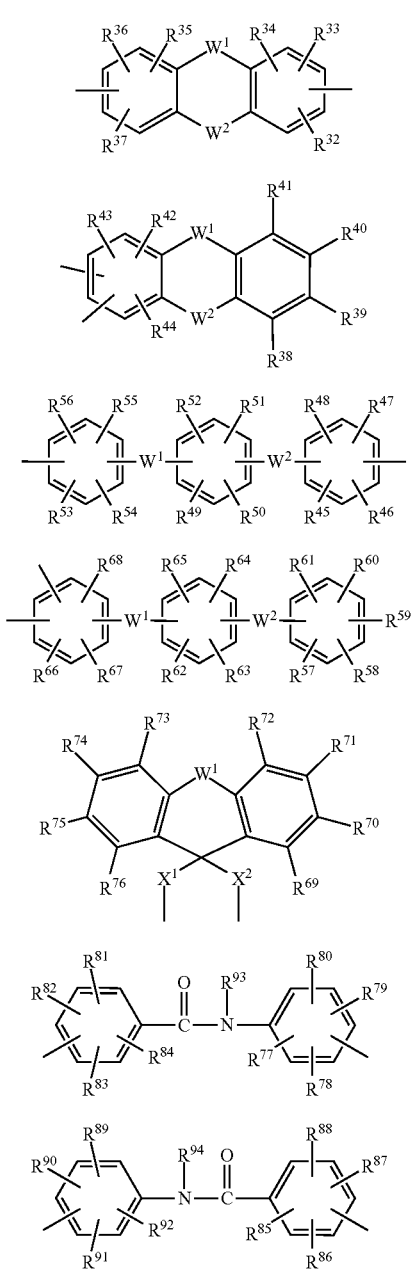

[wherein $R^1$ to $R^{92}$ are each independently a hydrogen atom, a halogen atom, a carboxyl group, a sulfo group, an alkyl group of 1 to 10 carbon atoms which may have a branched structure, or an alkoxy group of 1 to 10 carbon atoms which may have a branched structure;

$R^{93}$ and $R^{94}$ are each a hydrogen atom or an alkyl group of 1 to 10 carbon atoms which may have a branched structure;

$W^1$ and $W^2$ are each independently a single bond, $CR^{95}R^{96}$ (wherein $R^{95}$ and $R^{96}$ are each independently a hydrogen atom or an alkyl group of 1 to 10 carbon atoms which may have a branched structure, and $R^{95}$ and $R^{96}$ may together form a ring), C=O, O, S, SO, $SO_2$ or $NR^{97}$ ($R^{97}$ being a hydrogen atom or an alkyl group of 1 to 10 carbon atoms which may have a branched structure); and $X^1$ and $X^2$ are each independently a single bond, an alkylene group of 1 to 10 carbon atoms which may have a branched structure, or a group of formula (14)

[Chemical Formula 3]

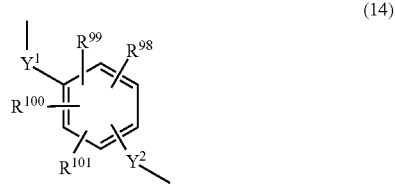

(wherein $R^{98}$ to $R^{101}$ are each independently a hydrogen atom, a halogen atom, a carboxyl group, a sulfo group, an alkyl group of 1 to 10 carbon atoms which may have a branched structure, or an alkoxy group of 1 to 10 carbon atoms which may have a branched structure; and $Y^1$ and $Y^2$ are each independently a single bond or an alkylene group of 1 to 10 carbon atoms which may have a branched structure)]}, and an organic solvent containing a glycol dialkyl ether-type solvent in a proportion of more than 50 wt %;

2. The film-forming composition for ink-jet coating of 1 above, wherein the organic solvent further includes one or both of a glycol monoalkyl ether-type solvent and a glycol-type solvent;

3. The film-forming composition for ink-jet coating of 2 above, wherein the weight A of the glycol dialkyl ether-type solvent and the combined weight B of the glycol monoalkyl ether-type solvent and the glycol-type solvent have a ratio A:B therebetween of from 99:1 to 51:49;

4. The film-forming composition for ink-jet coating of any of 1 to 3 above, wherein the glycol dialkyl ether-type solvent is a diethylene glycol dialkyl ether;

5. The film-forming composition for ink-jet coating of 4 above, wherein the diethylene glycol dialkyl ether is diethylene glycol dimethyl ether;

6. The film-forming composition for ink-jet coating of any of 2 to 5 above, wherein the glycol monoalkyl ether-type solvent is a propylene glycol monoalkyl ether;

7. The film-forming composition for ink-jet coating of 6 above, wherein the propylene glycol monoalkyl ether is propylene glycol monomethyl ether;

8. The film-forming composition for ink-jet coating of any of 2 to 7 above, wherein the glycol-type solvent is diethylene glycol;

9. The film-forming composition for ink-jet coating of any of 1 to 8 above, further comprising a crosslinking agent;

10. The film-forming composition for ink-jet coating of 9 above, wherein the crosslinking agent is a poly(meth) acrylic compound;

11. The film-forming composition for ink-jet coating of any of 1 to 10 above which has a surface tension of from 25 to 35 mN/m;

12. The film-forming composition for ink-jet coating of any of 1 to 11 above which has a viscosity at 23° C. of from 5 to 20 mPa·s;

13. A thin film-forming method which forms a thin film by ink-jet coating the film-forming composition of any of 1 to 12 above;

14. A thin film obtained by the method of 13 above;

15. An electronic device comprising a substrate and the thin film of 14 above formed on the substrate; and 16. An optical member comprising a substrate and the thin film of 14 above formed on the substrate.

Advantageous Effects of the Invention

This invention enables a triazine ring-containing polymer-containing film-forming composition to be obtained which does not readily erode the head of an ink-jet coater and droplets of which are ejected well from the ink-jet coater head.

Using this composition, a high-refractive index film in a desired pattern can be easily produced by pattern printing with an ink-jet coater.

Thin films produced from the inventive composition are able to exhibit the properties of high heat resistance, high refractive index and low volume shrinkage. Hence, they can be advantageously used in the fields of electronic devices and optical materials as, for example, components in the fabrication of liquid-crystal displays, organic electroluminescent (EL) displays, touch panels, optical semiconductor (LED) devices, solid-state image sensors, organic thin-film solar cells, dye-sensitized solar cells, organic thin-film transistors (TFTs), lenses, prisms, cameras, binoculars, microscopes, semiconductor steppers and the like.

In particular, because thin films produced from the inventive composition have a high transparency and also a high index of refraction, the visibility of transparent conductive films made of indium tin oxide (ITO), silver nanowires or the like can be improved and deterioration of the transparent conductive film can be minimized.

EMBODIMENT FOR CARRYING OUT THE INVENTION

The invention is described more fully below.

The triazine ring-containing polymer of this invention includes a triazine ring-containing polymer containing a recurring unit structure of formula (1) below, and an organic solvent containing a glycol dialkyl ether-type solvent in a proportion of more than 50 wt %.

[Chemical Formula 4]

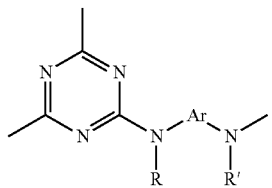

(1)

In the formula, R and R' are each independently a hydrogen atom, an alkyl group, an alkoxy group, an aryl group or an aralkyl group. From the standpoint of further increasing the refractive index, both are preferably hydrogen atoms.

In the invention, the number of carbon atoms on the alkyl group, although not particularly limited, is preferably from 1 to 20. To further increase the heat resistance of the polymer, the number of carbon atoms is more preferably from 1 to 10, and even more preferably from 1 to 3. The structure may be acyclic, branched or cyclic.

Illustrative examples of the alkyl group include methyl, ethyl, n-propyl, isopropyl, cyclopropyl, n-butyl, isobutyl, s-butyl, t-butyl, cyclobutyl, 1-methylcyclopropyl, 2 methylcyclopropyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-methylcyclobutyl, 2-methylcyclobutyl, 3-methylcyclobutyl, 1,2-dimethylcyclopropyl, 2,3-dimethylcyclopropyl, 1-ethylcyclopropyl, 2-ethylcyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methylcyclopentyl, 2-methylcyclopentyl, 3-methylcyclopentyl, 1-ethylcyclobutyl, 2 ethylcyclobutyl, 3-ethylcyclobutyl, 1,2 dimethylcyclobutyl, 1,3-dimethylcyclobutyl, 2,2-dimethylcyclobutyl, 2,3-dimethylcyclobutyl, 2,4-dimethylcyclobutyl, 3,3-dimethylcyclobutyl, 1-n-propylcyclopropyl, 2-n-propylcyclopropyl, 1-isopropylcyclopropyl, 2-isopropylcyclopropyl, 1,2,2-trimethylcyclopropyl, 1,2,3-trimethylcyclopropyl, 2,2,3-trimethylcyclopropyl, 1-ethyl-2-methylcyclopropyl, 2-ethyl-1-methylcyclopropyl, 2-ethyl-2-methylcyclopropyl and 2-ethyl-3-methylcyclopropyl groups.

The number of carbon atoms on the alkoxy group, although not particularly limited, is preferably from 1 to 20. To further increase the heat resistance of the polymer, the number of carbon atoms is more preferably from 1 to 10, and even more preferably from 1 to 3. The structure of the alkyl moiety thereon may be acyclic, branched or cyclic.

Illustrative examples of the alkoxy group include methoxy, ethoxy, n-propoxy, isopropoxy, n-butoxy, isobutoxy, s-butoxy, t-butoxy, n-pentoxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy and 1-ethyl-2-methyl-n-propoxy groups.

The number of carbon atoms on the aryl group, although not particularly limited, is preferably from 6 to 40. To further increase the heat resistance of the polymer, the number of carbon atoms is more preferably from 6 to 16, and even more preferably from 6 to 13.

Illustrative examples of the aryl group include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9-phenanthryl groups.

The number of carbon atoms on the aralkyl group, although not particularly limited, is preferably from 7 to 20. The alkyl moiety thereon may be acyclic, branched or cyclic.

Illustrative examples include benzyl, p-methylphenylmethyl, m-methylphenylmethyl, o-trifluoromethylphenyl, o-trifluoromethylphenyl, p-trifluoromethylphenyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl groups.

Ar represents at least one moiety selected from the group consisting of moieties of formulas (2) to (13).

[Chemical Formula 5]

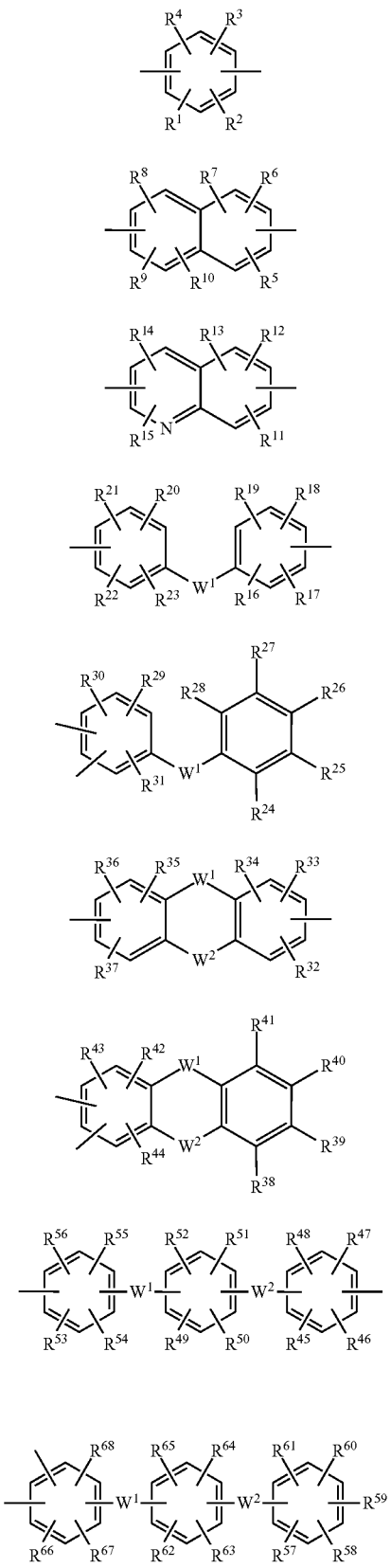

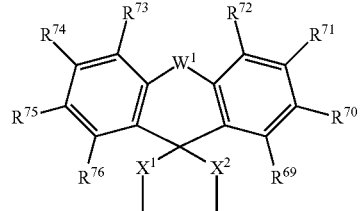

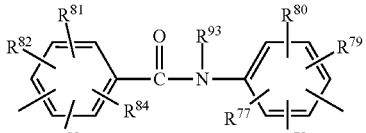

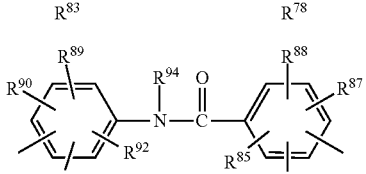

R¹ to R⁹² above each independently represent a hydrogen atom, a halogen atom, a carboxyl group, a sulfo group, an alkyl group of 1 to 10 carbon atoms which may have a branched structure, or an alkoxy group of 1 to 10 carbon atoms which may have a branched structure; R⁹³ and R⁹⁴ each represent a hydrogen atom or an alkyl group of 1 to 10 carbon atoms which may have a branched structure; and W¹ and W² each independently represent a single bond, CR⁹⁵R⁹⁶ (wherein R⁹⁵ and R⁹⁶ are each independently a hydrogen atom or an alkyl group of 1 to 10 carbon atoms which may have a branched structure, and R⁹⁵ and R⁹⁶ may together form a ring), C=O, O, S, SO, SO₂, or NR⁹⁷ (wherein R⁹⁷ is a hydrogen atom or an alkyl group of 1 to 10 carbon atoms which may have a branched structure).

Examples of the halogen atom include fluorine, chlorine, bromine and iodine atoms.

The alkyl groups and alkoxy groups are exemplified in the same way as above.

X¹ and X² each independently represent a single bond, an alkylene group of 1 to 10 carbon atoms which may have a branched structure, or a group of formula (14).

[Chemical Formula 6]

R⁹⁸ to R¹⁰¹ above each independently represent a hydrogen atom, a halogen atom, a carboxyl group, a sulfo group, an alkyl group of 1 to 10 carbon atoms which may have a branched structure, or an alkoxy group of 1 to 10 carbon atoms which may have a branched structure; and Y¹ and Y² each independently represent a single bond or an alkylene group of 1 to 10 carbon atoms which may have a branched structure. These halogen atoms, alkyl groups and alkoxy groups are exemplified in the same way as above.

Examples of the alkylene group of 1 to 10 carbon atoms which may have a branched structure include methylene, ethylene, propylene, trimethylene, tetramethylene and pentamethylene groups.

Of these, $R^1$ to $R^{92}$ and $R^{98}$ to $R^{101}$ are preferably hydrogen atoms, halogen atoms, sulfo groups, alkyl groups of 1 to 5 carbon atoms which may have a branched structure or alkoxy groups of 1 to 5 carbon atoms which may have a branched structure; and are more preferably hydrogen atoms.

In particular, Ar is preferably at least one moiety of formulas (2) and (5) to (13), and more preferably at least one moiety of formulas (2), (5), (7), (8) and (11) to (13). Specific examples of aryl moieties of formulas (2) to (13) include, but are not limited to, those having the formulas shown below.

[Chemical Formula 7]

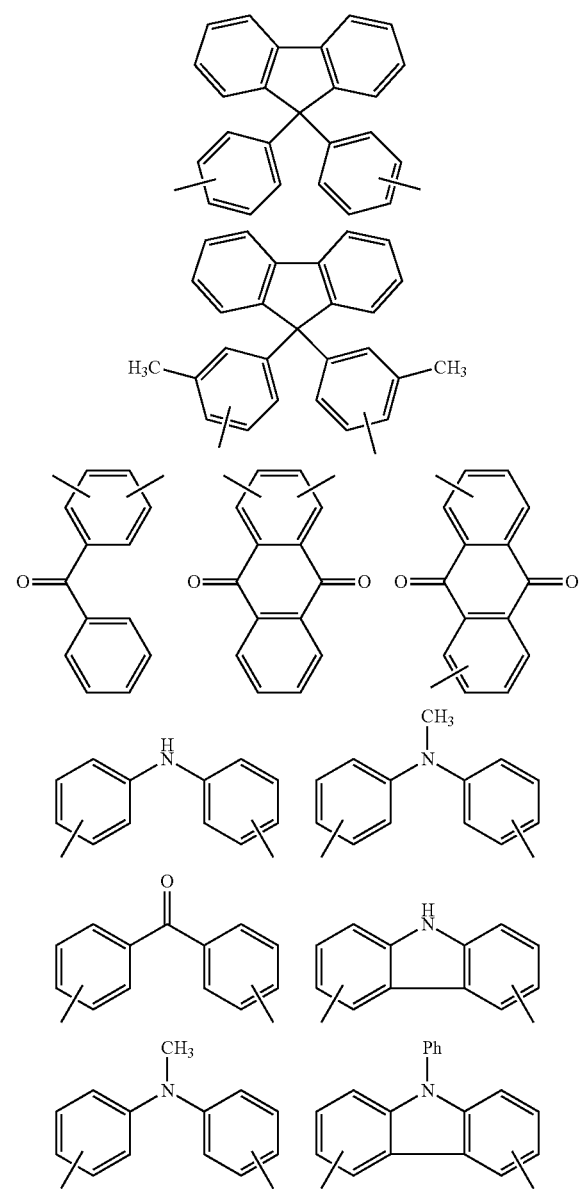

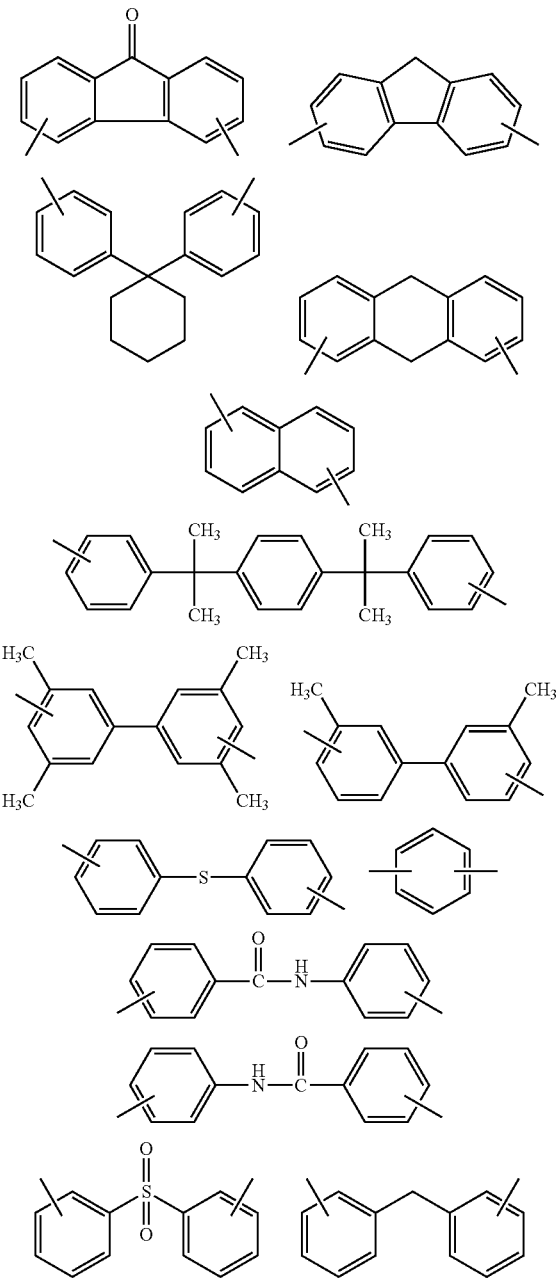

Of these, aryl moieties of the following formulas are more preferred because a polymer having a higher refractive index can be obtained.

[Chemical Formula 8]

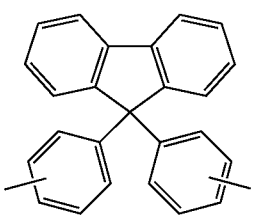

-continued

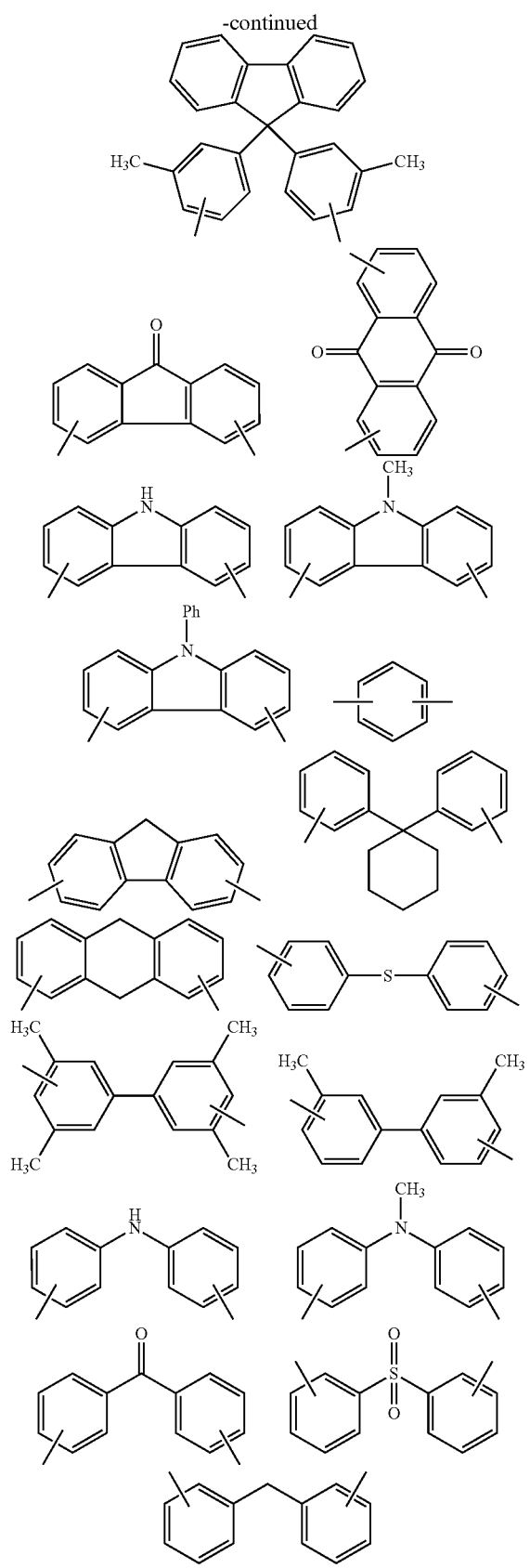

In particular, to further increase the solubility of the triazine ring-containing polymer in organic solvents such as low-polarity solvents, Ar is preferably the m-phenylene group shown in formula (15).

[Chemical Formula 9]

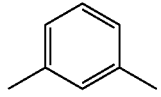

(15)

The triazine ring-containing polymer used in this invention is preferably one having the recurring unit structure of formula (16), and more preferably one having the recurring unit structure of formula (17).

[Chemical Formula 10]

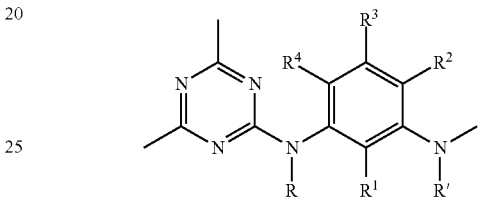

(16)

In formula (16), R, R' and $R^1$ to $R^4$ are as defined above.

[Chemical Formula 11]

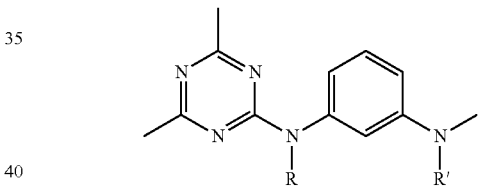

(17)

In formula (17), R and R' are as defined above.

The triazine ring-containing polymer used in the invention is most preferably a hyperbranched polymer of formula (18).

[Chemical Formula 12]

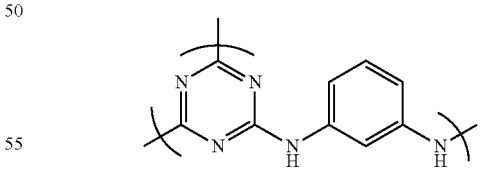

(18)

The polymer of the invention has a weight-average molecular weight which, although not particularly limited, is preferably between 500 and 500,000, and more preferably between 500 and 100,000. To further enhance the heat resistance and lower the shrinkage ratio, the Mw is preferably at least 2,000. To further increase the solubility and lower the viscosity of the resulting solution, the weight-average molecular weight is preferably 50,000 or less, more preferably 30,000 or less, and even more preferably 10,000 or less.

The weight-average molecular weight in this invention is the average molecular weight as measured by gel permeation chromatography (GPC) and calibrated against a polystyrene standard.

The triazine ring-containing polymer (hyperbranched polymer) of the invention may be prepared by the method disclosed in above-cited Patent Document 1.

For example, as shown in Scheme 1 below, a hyperbranched polymer having a recurring structure (21) can be obtained by reacting a cyanuric halide (19) and an m-phenylenediamine compound (20) within a suitable organic solvent.

[Chemical Formula 13]

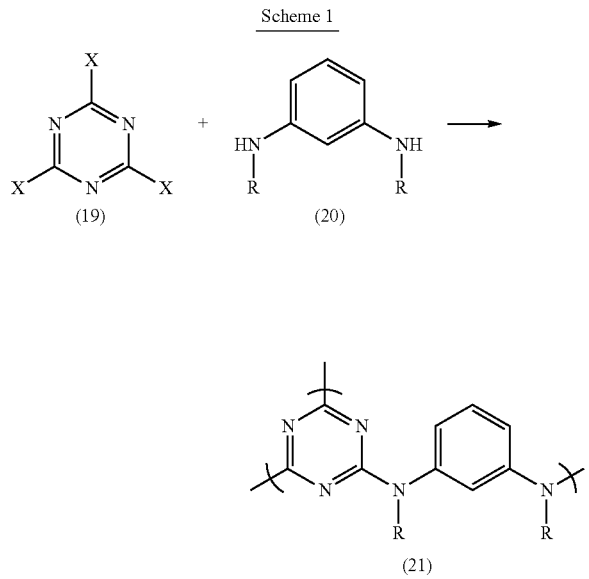

Here, each X is independently a halogen atom, and R is as defined above.

As shown in Scheme 2 below, a hyperbranched polymer having a recurring structure (21) can be obtained from a compound (22) obtained by reacting equimolar amounts of a cyanuric halide (19) and an m-phenylenediamine compound (20) within a suitable organic solvent.

[Chemical Formula 14]

Scheme 2

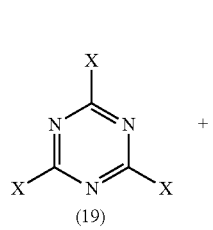

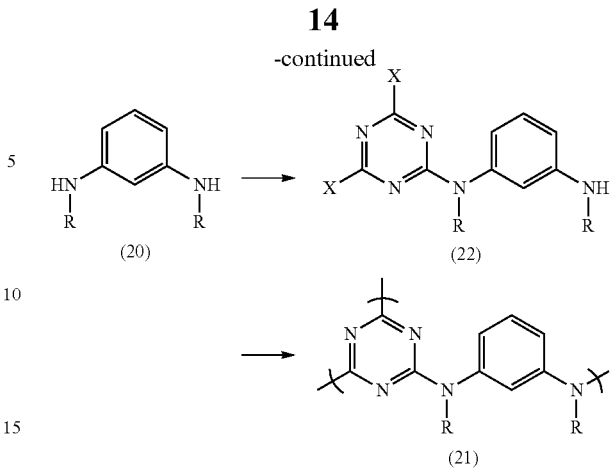

Here, each X is independently a halogen atom, and R is as defined above.

In the methods of Schemes 1 and 2, the respective starting materials may be charged in any amount so long as the target polymer can be obtained, although the use of from 0.01 to 10 equivalents of the diamino compound (20) per equivalent of the cyanuric halide (19) is preferred.

In particular, in the method of Scheme 1, it is preferable to avoid using 3 equivalents of the diamino compound (20) per 2 equivalents of the cyanuric halide (19). By including the respective functional groups in amounts that are not chemically equivalent, the formation of a gel can be prevented.

To obtain hyperbranched polymers of various molecular weights which have many terminal triazine rings, it is preferable to use the diamino compound (20) in an amount of less than 3 equivalents per 2 equivalents of the cyanuric halide (19).

On the other hand, to obtain hyperbranched polymers of various molecular weights which have many terminal amines, it is preferable to use the cyanuric halide (19) in an amount of less than 2 equivalents per 3 equivalents of the diamino compound (20).

The molecular weight of the resulting hyperbranched polymer can be easily adjusted by suitably adjusting the amounts of the diamino compound (20) and the cyanuric halide (19) in this way.

The molecular weight of the hyperbranched polymer may be adjusted by controlling the concentration within the organic solvent. In this case, the reaction concentration (solids concentration) is preferably from 1 to 100 wt %, more preferably from 5 to 50 wt %, and even more preferably from 10 to 25 wt %.

Various solvents that are commonly used in this type of reaction may be used as the organic solvent. Illustrative examples include tetrahydrofuran, dioxane, dimethylsulfoxide; amide solvents such as N,N-dimethylformamide, N-methyl-2-pyrrolidone, tetramethylurea, hexamethylphosphoramide, N,N-dimethylacetamide, N-methyl-2-piperidone, N,N-dimethylethyleneurea, N,N,N',N'-tetramethylmalonamide, N-methylcaprolactam, N-acetylpyrrolidine, N,N-diethylacetamide, N-ethyl-2-pyrrolidone, N,N-dimethylpropionamide, N,N-dimethylisobutyramide, N-methylformamide and N,N'-dimethylpropyleneurea; and mixed solvents thereof.

Of the above, N,N-dimethylformamide, dimethylsulfoxide, N-methyl-2-pyrrolidone, N,N-dimethylacetamide, and mixed solvents thereof are preferred. N,N-Dimethylacetamide and N-methyl-2-pyrrolidone are especially preferred.

In the Scheme 1 reaction and the second stage reaction in Scheme 2, the reaction temperature may be suitably set in the range from the melting point to the boiling point of the solvent used, although the temperature is preferably from about 0° C. to about 150° C., and more preferably from 60° C. to 100° C.

In the Scheme 1 reaction in particular, to suppress linearity and increase the degree of branching, the reaction temperature is preferably from 60° C. to 150° C., more preferably from 80° C. to 150° C., and even more preferably from 80° C. to 120° C.

However, from the standpoint of obtaining a polymer having the above-mentioned weight-average molecular weight, mixing of the cyanuric halide (19) and the diamino compound (2) is preferably carried out at a low temperature, the temperature in this case preferably being from about −50° C. to about 50° C., more preferably from about −20° C. to about 50° C., and even more preferably from −20° C. to 10° C. After low-temperature charging, the reaction is preferably carried out by effecting the reaction for a given time at that temperature and subsequently raising the temperature without interruption (in a single step) up to the polymerization temperature.

In the first stage method of Scheme 2, the reaction temperature may be suitably set in the range from the melting point to the boiling point of the solvent used, with a temperature of from about −50° C. to about 50° C. being preferred, a temperature of from about −20° C. to about 50° C. being more preferred, a temperature of from about −10° C. to about 50° C. being even more preferred, and a temperature of from −10° C. to 10° C. being still more preferred.

In the Scheme 2 method in particular, it is preferable to use a two-stage process consisting of a first step in which the reaction is effected at from −50° C. to 50° C., followed by a second step in which the reaction is effected at from 60° C. to 150° C.

In each of the above reactions, the ingredients may be added in any order. However, in the Scheme 1 reaction, the method of cooling a solution containing either the cyanuric halide (19) or the diamino compound (20) and the organic solvent, and then adding to this solution the remaining ingredient—namely, the diamino compound (20) or the cyanuric halide (19)—is preferred.

Following the mixture of both compounds, it is preferable to carry out the reaction at the above-indicated low temperature for a period of from about 0.5 hour to about 3 hours, and then to effect polymerization by heating without interruption to from 60 to 150° C.

In the Scheme 2 reactions, either ingredient may be used as the ingredient which is initially dissolved in the solvent or as the ingredient which is subsequently added, although a method wherein the diamino compound (20) is added to a cooled solution of the cyanuric halide (19) is preferred. Addition may be carried out gradually, such as in a dropwise manner, or the entire amount may be added all at once in a batchwise manner.

The subsequently added ingredient may be added neat or may be added as a solution of the ingredient dissolved in an organic solvent such as any of those mentioned above. However, taking into account the ease of operation and the controllability of the reaction, the latter approach is preferred.

In the Scheme 1 reaction and the second stage reaction in Scheme 2, various bases which are commonly used during or after polymerization may be added.

Examples of such bases include potassium carbonate, potassium hydroxide, sodium carbonate, sodium hydroxide, sodium ethoxide, sodium acetate, lithium carbonate, lithium hydroxide, lithium oxide, potassium acetate, magnesium oxide, calcium oxide, barium hydroxide, trilithium phosphate, trisodium phosphate, tripotassium phosphate, cesium fluoride, aluminum oxide, ammonia, trimethylamine, triethylamine, diisopropylamine, diisopropylethylamine, N-methylpiperidine, 2,2,6,6 tetramethyl-N-methylpiperidine, pyridine, 4-dimethylaminopyridine and N-methylmorpholine.

The amount of base added per equivalent of the cyanuric halide (19) is preferably from 1 to 100 equivalents, and more preferably from 1 to 10 equivalents. These bases may be used in the form of an aqueous solution.

In the methods of both schemes, following reaction completion, the product can be easily purified by a suitable technique such as re-precipitation.

Also, in the present invention, some portion of the halogen atoms on at least one terminal triazine ring may be capped with, for example, alkyl groups, aralkyl groups, aryl groups, alkylamino groups, alkoxysilyl-containing alkylamino groups, aralkylamino groups, arylamino groups, alkoxy groups, aralkyloxy groups, aryloxy groups or ester groups.

Of these, alkylamino groups, alkoxysilyl-containing alkylamino groups, aralkylamino groups and arylamino groups are preferred. Alkylamino groups and arylamino groups are more preferred. Arylamino groups are even more preferred.

The above alkyl groups and alkoxy groups are exemplified by the same groups as mentioned above.

Examples of ester groups include methoxycarbonyl and ethoxycarbonyl groups.

Examples of aryl groups include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9-phenanthryl groups.

Examples of aralkyl groups include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl groups.

Examples of alkylamino groups include methylamino, ethylamino, n-propylamino, isopropylamino, n-butylamino, isobutylamino, s-butylamino, t-butylamino, n-pentylamino, 1-methyl-n-butylamino, 2-methyl-n-butylamino, 3-methyl-n-butylamino, 1,1-dimethyl-n-propylamino, 1,2-dimethyl-n-propylamino, 2,2-dimethyl-n-propylamino, 1-ethyl-n-propylamino, n-hexylamino, 1-methyl-n-pentylamino, 2-methyl-n-pentylamino, 3-methyl-n-pentylamino, 4-methyl-n-pentylamino, 1,1-dimethyl-n-butylamino, 1,2-dimethyl-n-butylamino, 1,3-dimethyl-n-butylamino, 2,2-dimethyl-n-butylamino, 2,3-dimethyl-n-butylamino, 3,3-dimethyl-n-butylamino, 1-ethyl-n-butylamino, 2-ethyl-n-butylamino, 1,1,2-trimethyl-n-propylamino, 1,2,2-trimethyl-n-propylamino, 1-ethyl-1-methyl-n-propylamino and 1-ethyl-2-methyl-n-propylamino groups.

Examples of aralkylamino groups include benzylamino, methoxycarbonylphenylmethylamino, ethoxycarbonylphenylmethylamino, p-methylphenylmethylamino, m-methylphenylmethylamino, o-ethylphenylmethylamino, m-ethylphenylmethylamino, p-ethylphenylmethylamino, 2-propylphenylmethylamino, 4-isopropylphenylmethylamino, 4-isobutylphenylmethylamino, naphthylmethylamino, methoxycarbonylnaphthylmethylamino and ethoxycarbonylnaphthylmethylamino groups.

Examples of arylamino groups include phenylamino, methoxycarbonylphenylamino, ethoxycarbonylphenylamino, naphthylamino, methoxycarbonylnaphthylamino, ethoxycarbonylnaphthylamino, anthranylamino, pyrenylamino, biphenylamino, terphenylamino and fluorenylamino groups.

Alkoxysilyl-containing alkylamino groups are exemplified by monoalkoxysilyl-containing alkylamino groups, dialkoxysilyl-containing alkylamino groups and trialkoxysilyl-containing alkylamino groups. Illustrative examples include 3-trimethoxysilylpropylamino, 3-triethoxysilylpropylamino, 3-dimethylethoxysilylpropylamino, 3-methyldiethoxysilylpropylamino, N-(2-aminoethyl)-3-dimethylmethoxysilylpropylamino, N-(2-aminoethyl)-3-methyldimethoxysilylpropylamino and N-(2-aminoethyl)-3-trimethoxysilylpropylamino groups.

Examples of aryloxy groups include phenoxy, naphthoxy, anthranyloxy, pyrenyloxy, biphenyloxy, terphenyloxy and fluorenyloxy groups.

Examples of aralkyloxy groups include benzyloxy, p-methylphenylmethyloxy, m-methylphenylmethyloxy, o-ethylphenylmethyloxy, m-ethylphenylmethyloxy, p-ethylphenylmethyloxy, 2-propylphenylmethyloxy, 4-isopropylphenylmethyloxy, 4-isobutylphenylmethyloxy and α-naphthylmethyloxy groups.

These groups can be easily introduced by replacing a halogen atom on a triazine ring with a compound that furnishes the corresponding substituent. For example, as shown in Scheme 3 below, by adding an aniline derivative and inducing the reaction, a hyperbranched polymer (23) having a phenylamino group on at least one end is obtained.

[Chemical Formula 15]

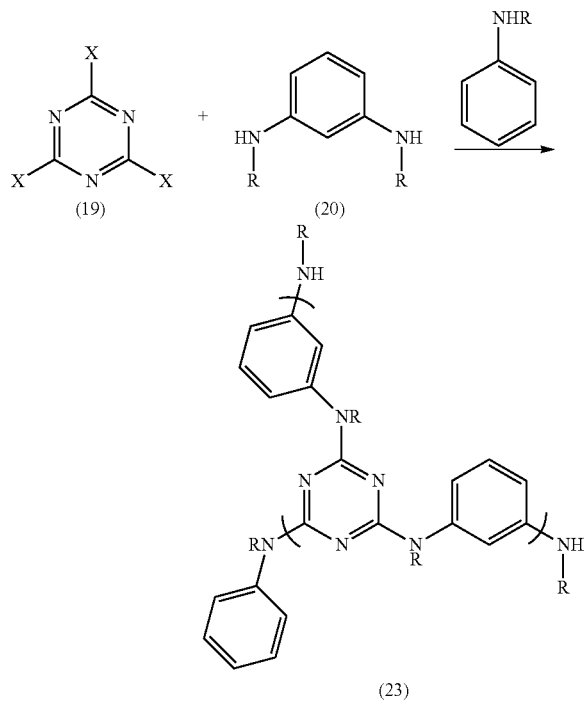

Scheme 3

(19)   (20)

(23)

In these formulas, X and R are as defined above.

An organic monoamine is concurrently charged at this time. That is, by reacting the cyanuric halide with a diaminoaryl compound in the presence of an organic monoamine, it is possible to obtain a flexible hyperbranched polymer having a low degree of branching in which the rigidity typical of hyperbranched polymers has been eased.

The hyperbranched polymer obtained in this way has an excellent solubility in a solvent (meaning that agglomeration is inhibited) and has an excellent crosslinkability.

An alkyl monoamine, aralkyl monoamine or aryl monoamine may be used here as the organic monoamine.

Examples of alkyl monoamines include methylamine, ethylamine, n-propylamine, isopropylamine, n-butylamine, isobutylamine, s-butylamine, t-butylamine, n-pentylamine, 1-methyl-n-butylamine, 2-methyl-n-butylamine, 3-methyl-n-butylamine, 1,1-dimethyl-n-propylamine, 1,2-dimethyl-n-propylamine, 2,2-dimethyl-n-propylamine, 1-ethyl-n-propylamine, n-hexylamine, 1-methyl-n-pentylamine, 2-methyl-n-pentylamine, 3-methyl-n-pentylamine, 4-methyl-n-pentylamine, 1,1-dimethyl-n-butylamine, 1,2-dimethyl-n-butylamine, 1,3-dimethyl-n-butylamine, 2,2-dimethyl-n-butylamine, 2,3-dimethyl-n-butylamine, 3,3-dimethyl-n-butylamine, 1-ethyl-n-butylamine, 2-ethyl-n-butylamine, 1,1,2-trimethyl-n-propylamine, 1,2,2 trimethyl-n-propylamine, 1-ethyl-1-methyl-n-propylamine, 1-ethyl-2-methyl-n-propylamine and 2-ethylhexylamine.

Examples of aralkyl monoamines include benzylamine, p-methoxycarbonylbenzylamine, p-ethoxycarbonylphenylbenzyl, p-methylbenzylamine, m-methylbenzylamine and o-methoxybenzylamine.

Examples of aryl monoamines include aniline, p-methoxycarbonylaniline, p-ethoxycarbonylaniline, p-methoxyaniline, 1-naphthylamine, 2-naphthylamine, anthranylamine, 1-aminopyrene, 4-biphenylylamine, o-phenylaniline, 4-amino-p-terphenyl and 2-aminofluorene.

In this case, the amount of organic monoamine used per equivalent of the cyanuric halide is set to preferably from 0.05 to 500 equivalents, more preferably from 0.05 to 120 equivalents, and even more preferably from 0.05 to 50 equivalents.

To suppress linearity and increase the degree of branching, the reaction temperature in this case is preferably from 60 to 150° C., more preferably from 80 to 150° C., and even more preferably from 80 to 120° C.

However, mixing of the three ingredients—the organic monoamine, the cyanuric halide and the diaminoaryl compound—may be carried out at the above-mentioned low temperature. Also, after low-temperature charging, it is preferable to raise the temperature without interruption (i.e., in a single step) to the polymerization temperature and carry out the reaction.

Alternatively, the mixing of two ingredients—the cyanuric halide and the diaminoaryl compound—may be carried out at the above-mentioned low temperature, following which the organic monoamine may be added at the low temperature, the temperature may be raised without interruption (i.e., in a single step) to the polymerization temperature and the reaction thereby carried out.

The reaction of the cyanuric halide with the diaminoaryl compound in the presence of such an organic monoamine may be carried out using an organic solvent like any of those mentioned above.

The film-forming composition of the invention is prepared by dissolving the above triazine ring-containing polymer in an organic solvent containing a glycol dialkyl ether-type solvent in a proportion of more than 50 wt %.

Examples of glycol dialkyl ether-type solvents include ethylene glycol dimethyl ether, ethylene glycol diethyl ether, propylene glycol dimethyl ether, propylene glycol diethyl ether, diethylene glycol dimethyl ether, diethylene glycol diethyl ether, triethylene glycol dimethyl ether and triethylene glycol diethyl ether. Of these, diethylene glycol dialkyl ethers such as diethylene glycol dimethyl ether are preferred, and diethylene glycol dimethyl ether is more preferred. These glycol dialkyl ether-type solvents may be used singly or two or more may be used in combination.

In this invention, the amount of glycol dialkyl ether-type solvent used is set to more than 50 wt % of the organic solvent used in the composition. However, from the standpoint of setting the viscosity and surface tension of the composition within ranges suitable for an ink-jet coater, the amount is preferably at least 55 wt %, more preferably at least 60 wt %, and even more preferably at least 65 wt %.

To set the viscosity and surface tension of the film-forming composition within ranges that are more suitable for an ink-jet coater, in addition to the above glycol dialkyl ether-type solvent, it is preferable to use one or both of a glycol monoalkyl ether-type solvent and a glycol-type solvent, and even more preferable to use one of these together with a glycol dialkyl ether-type solvent.

Examples of glycol monoalkyl ether-type solvents include ethylene glycol monomethyl ether, ethylene glycol monoethyl ether, ethylene glycol monoisopropyl ether, ethylene glycol monobutyl ether, propylene glycol monomethyl ether, propylene glycol monoethyl ether, propylene glycol monobutyl ether, diethylene glycol monomethyl ether, diethylene glycol monoethyl ether, dipropylene glycol monomethyl ether and dipropylene glycol monoethyl ether. Of these, a propylene glycol monoalkyl ether such as propylene glycol monomethyl ether is preferred, and propylene glycol monomethyl ether is more preferred. These glycol monoalkyl ether-type solvents may be used singly or two or more may be used in combination.

Examples of glycol-type solvents include ethylene glycol, trimethylene glycol, propylene glycol, hexylene glycol, diethylene glycol and triethylene glycol. These may be used singly, or two or more may be used in combination.

When the above glycol monoalkyl ether-type solvent and/or glycol-type solvent are used concomitantly, the amount of use thereof is not particularly limited. However, taking into account the ink-jet coatability of the resulting film-forming composition, letting "A" be the weight of the glycol dialkyl ether-type solvent and "B" be the combined weight of the glycol monoalkyl ether-type solvent and the glycol-type solvent, the ratio A:B is preferably from about 99:1 to about 51:49, more preferably from about 90:10 to about 60:40, and even more preferably from about 80:20 to about 65:35.

In the film-forming composition of the invention, the organic solvent used may be one that consists only of the glycol dialkyl ether-type solvent and a glycol monoalkyl ether-type solvent and/or a glycol-type solvent, although another organic solvent may be optionally added.

Examples of such other organic solvents include toluene, p-xylene, o-xylene, m-xylene, ethylbenzene, styrene, ethylene glycol methyl ether acetate, propylene glycol monomethyl ether acetate, ethylene glycol ethyl ether acetate, diethylene glycol monoethyl ether acetate, 1-octanol, 1-methoxy-2-butanol, cyclohexanol, diacetone alcohol, furfuryl alcohol, tetrahydrofurfuryl alcohol, benzyl alcohol, 1,3-butanediol, 1,4-butanediol, 2,3-butanediol, γ-butyrolactone, acetone, methyl ethyl ketone, methyl isopropyl ketone, diethyl ketone, methyl isobutyl ketone, methyl n-butyl ketone, cyclopentanone, cyclohexanone, ethyl acetate, isopropyl acetate, n-propyl acetate, isobutyl acetate, n-butyl acetate, ethyl lactate, methanol, ethanol, isopropanol, tert-butanol, allyl alcohol, n-propanol, 2-methyl-2-butanol, isobutanol, n-butanol, 2-methyl-1-butanol, 1-pentanol, 2-methyl-1-pentanol, 2-ethylhexanol, 1-methoxy-2-propanol, tetrahydrofuran, 1,4-dioxane, N,N-dimethylformamide, N,N-dimethylacetamide (DMAc), N-methylpyrrolidone, 1,3-dimethyl-2-imidazolidinone, dimethylsulfoxide and N-cyclohexyl-2-pyrrolidinone. These may be used singly, or two or more may be used in admixture.

When these other organic solvents are used, the amount of use thereof within the organic solvent used to prepare the composition is set to preferably 10 wt % or less, and more preferably 5 wt % or less.

A crosslinking agent may also be optionally added to the film-forming composition of the invention.

The crosslinking agent is not particularly limited, provided it is a compound having a substituent that can react with the triazine ring-containing polymer.

Such compounds are exemplified by melamine compounds having a crosslink-forming substituent such as a methylol group or a methoxymethyl group, substituted urea compounds, compounds having a crosslink-forming substituent such as an epoxy group or an oxetane group, blocked isocyanate-containing compounds, acid anhydride-containing compounds, compounds having a (meth)acrylic group, and phenoplast compounds. From the standpoint of heat resistance and shelf stability, a compound having an epoxy group, a blocked isocyanate group or a (meth)acrylic group is preferred. Compounds having a blocked isocyanate group, and polyepoxy compounds and/or poly(meth)acrylic compounds which provide a photocurable composition even without the use of an initiator are especially preferred.

When used for polymer end group treatment, these compounds should have at least one crosslink-forming substituent. When used for crosslinking treatment between polymers, they must have at least two crosslink-forming substituents.

The polyepoxy compound is not particularly limited, provided it has at least two epoxy groups on the molecule.

Examples include tris(2,3-epoxypropyl) isocyanurate, 1,4-butanediol diglycidyl ether, 1,2-epoxy-4-(epoxyethyl) cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, 1,2-cyclohexanedicarboxylic acid diglycidyl ester, 4,4'-methylenebis (N,N-diglycidylaniline), 3,4-epoxycyclohexylmethyl-3,4-epoxycyclohexane carboxylate, trimethylolethane triglycidyl ether, bisphenol A diglycidyl ether and pentaerythritol polyglycidyl ether.

Examples of commercial products that may be used include epoxy resins having at least two epoxy groups, such as YH-434 and YH 434L (from Tohto Kasci Co., Ltd.); epoxy resins having a cyclohexene oxide structure, such as Epolead GT-401, GT-403, GT-301 and GT-302, and also Celloxide 2021 and Celloxide 3000 (all from Daicel Chemical Industries, Ltd.); bisphenol A-type epoxy resins such as Epikote (now "jER") 1001, 1002, 1003, 1004, 1007, 1009, 1010 and 828 (all from Japan Epoxy Resin Co., Ltd.); bisphenol F-type epoxy resins such as Epikote (now "jER") 807 (Japan Epoxy Resin Co., Ltd.); phenol-novolak type epoxy resins such as Epikote (now "jER") 152 and 154 (Japan Epoxy Resin Co., Ltd.), and EPPN 201 and 202 (Nippon Kayaku Co., Ltd.); cresol-novolak type epoxy resins such as EOCN-102, 103S, 104S, 1020, 1025 and 1027 (Nippon Kayaku Co., Ltd.), and Epikote (now "jER")

180S75 (Japan Epoxy Resin Co., Ltd.); alicyclic epoxy resins such as Denacol EX-252 (Nagase ChemteX Corporation), CY175, CY177 and CY179 (Ciba-Geigy AG), Araldite CY-182, CY-192 and CY-184 (Ciba-Geigy AG), Epiclon 200 and 400 (DIC Corporation), Epikote (now "jER") 871 and 872 (Japan Epoxy Resin Co., Ltd.), and ED-5661 and ED-5662 (Celanese Coating KK); and aliphatic polyglycidyl ethers such as Denacol EX-611, EX-612, EX-614, EX-622, EX-411, EX-512, EX-522, EX-421, EX-313, EX-314 and EX-321 (Nagase ChemteX Corporation).

The poly(meth)acrylic compounds is not particularly limited, provided it has two or more (meth)acrylic groups per molecule.

Examples include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerol triacrylate, ethoxylated glycerol trimethacrylate, ethoxylated pentaerythritol tetraacrylate, ethoxylated pentaerythritol tetramethacrylate, ethoxylated dipentaerythritol hexaacrylate, polyglycerol monoethylene oxide polyacrylate, polyglycerol polyethylene glycol polyacrylate, dipentacrythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylolpropane triacrylate, trimethylolpropane trimethacrylate, tricyclodecane dimethanol diacrylate, tricyclodecane dimethanol dimethacrylate, 1,6-hexanediol diacrylate, 1,6-hexanediol dimethacrylate and polybasic acid-modified acrylic oligomers.

The poly(meth)acrylic compound may be acquired as a commercial product, illustrative examples of which include NK Ester A-200, A-400, A-600, A-1000, A-9300 (tris(2-acryloyloxyethyl) isocyanurate), A-9300-1CL, A-TMPT, UA-53H, 1G, 2G, 3G, 4G, 9G, 14G, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3EO, A-TMPT-9EO, AT-20E, ATM-4E and ATM-35E (all from Shin-Nakamura Chemical Co., Ltd.); KAYARAD® DPEA-12, PEG400DA, THE-330 and RP-1040 (all from Nippon Kayaku Co., Ltd.); Aronix® M-210 and M-350 (from Toagosei Co., Ltd.); KAYARAD® DPHA, NPGDA and PET30 (Nippon Kayaku Co., Ltd.); NK Ester A-DPH, A-TMPT, A-DCP, A-HD-N, TMPT, DCP, NPG and HD-N (all from Shin-Nakamura Chemical Co., Ltd.); NK Oligo U-15HA (Shin-Nakamura Chemical Co., Ltd.); NK Polymer Vanaresin GH-1203 (Shin-Nakamura Chemical Co., Ltd.); and DN-0075 (Nippon Kayaku Co., Ltd.).

The above polybasic acid-modified acrylic oligomers are also available as commercial products, examples of which include Aronix M-510 and 520 (Toagosei Co., Ltd.).

The acid anhydride compounds is not particularly limited, provided it is a carboxylic acid anhydride obtained by the dehydration/condensation of two molecules of carboxylic acid. Examples include those having one acid anhydride group per molecule, such as phthalic anhydride, tetrahydrophthalic anhydride, hexahydrophthalic anhydride, methyl tetrahydrophthalic anhydride, methyl hexahydrophthalic anhydride, nadic anhydride, methyl nadic anhydride, maleic anhydride, succinic anhydride, octyl succinic anhydride and dodecenyl succinic anhydride; and those having two acid anhydride groups per molecule, such as 1,2,3,4-cyclobutanetetracarboxylic dianhydride, pyromellitic anhydride, 3,4-dicarboxy-1,2,3,4-tetrahydro-1-naphthalenesuccinic dianhydride, bicyclo[3.3.0]octane-2,4,6,8-tetracarboxylic dianhydride, 5-(2,5-dioxotetrahydro-3-furanyl)-3-methyl-3-cyclohexene-1,2-dicarboxylic anhydride, 1,2,3,4-butanetetracarboxylic dianhydride, 3,3', 4,4'-benzophenonetetracarboxylic dianhydride, 3,3',4,4'-biphenyltetracarboxylic dianhydride, 2,2-bis(3,4-dicarboxyphenyl)hexafluoropropane dianhydride and 1,3-dimethyl-1,2,3,4-cyclobutanetetracarboxylic dianhydride.

The blocked isocyanate-containing compounds is not particularly limited, provided it is a compound having at least two blocked isocyanate groups per molecule, i.e., isocyanate groups (—NCO) that have been blocked with suitable protecting groups, and in which, upon exposure of the compound to an elevated temperature during heat curing, the protecting groups (blocking moieties) are removed by thermal dissociation and the isocyanate groups that form as a result induce crosslinking reactions with the resin. Such compounds are exemplified by compounds having at least two groups of the following formula (which groups may be the same or may each differ) per molecule.

[Chemical Formula 16]

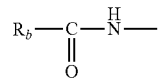

In the formula, $R_b$ is an organic group on the blocking moiety.

Such a compound can be obtained by, for example, reacting a suitable blocking agent with a compound having two or more isocyanate groups per molecule.

Examples of compounds having two or more isocyanate groups per molecule include polyisocyanates such as isophorone diisocyanate, 1,6-hexamethylene diisocyanate, methylenebis(4-cyclohexyl isocyanate) and trimethylhexamethylene diisocyanate, and also dimers and trimers thereof, as well as the reaction products of these with diols, triols, diamines or triamines.

Examples of the blocking agent include alcohols such as methanol, ethanol, isopropanol, n-butanol, 2-ethoxyhexanol, 2-N,N-dimethylaminoethanol, 2-ethoxyethanol and cyclohexanol; phenols such as phenol, o-nitrophenol, p-chlorophenol, and o-, m- and p-cresol; lactams such as ε-caprolactam; oximes such as acetone oxime, methyl ethyl ketone oxime, methyl isobutyl ketone oxime, cyclohexanone oxime, acetophenone oxime and benzophenone oxime; pyrazoles such as pyrazole, 3,5-dimethylpyrazole and 3-methylpyrazole; and thiols such as dodecanethiol and benzenethiol.

Compounds containing blocked isocyanate groups may also be acquired as commercial products, examples of which include B-830, D-815N, B-842N, B-870N, B-874N, B-882N, B-7005, B7030, B-7075 and B-5010 (all from Mitsui Chemicals Polyurethanes, Inc.); Duranate® 17B-60PX, TPA-B80E, MF-B60X, MF-K60X and E402-B80T (all from Asahi Kasei Chemicals Corporation); and KarenzMOI-BM™ (Showa Denko KK).

The aminoplast compound is not particularly limited, provided it is a compound which has at least two methoxymethylene groups per molecule. Examples include the following melamine compounds: compounds of the Cymel® series, such as hexamethoxymethylmelamine (Cymel® 303), tetrabutoxymethylglycoluril (Cymel® 1170) and tetramethoxymethylbenzoguanamine (Cymel® 1123) (all from Nihon Cytec Industries, Inc.); and compounds of the Nikalac® series, including the methylated melamine resins Nikalac® MW-30HM, MW-390, MW-100LM and MX-750LM, and the methylated urea resins Nikalac® MX-270, MX-280 and MX-290 (all from Sanwa Chemical Co., Ltd.).

The oxetane compounds are not particularly limited, provided they are compounds which have at least two oxetanyl groups per molecule. Examples include the oxetanyl group-containing compounds OXT-221, OX-SQ-H and OX-SC (from Toagosei Co., Ltd.).

A phenoplast compound is a compound which has at least two hydroxymethylene groups per molecule. Upon exposure to an elevated temperature during heat curing, crosslinking reactions proceed by way of dehydration/condensation reactions with the polymer of the invention.

Examples of phenoplast compounds include 2,6-dihydroxymethyl-4-methylphenol, 2,4-dihydroxymethyl-6-methylphenol, bis(2-hydroxy-3-hydroxymethyl-5-methylphenyl)methane, bis(4-hydroxy-3-hydroxymethyl-5-methylphenyl)methane, 2,2-bis(4-hydroxy-3,5-dihydroxymethylphenyl)propane, bis(3-formyl-4-hydroxyphenyl)methane, bis(4-hydroxy-2,5-dimethylphenyl)formylmethane and α,α-bis(4-hydroxy-2,5-dimethylphenyl)-4-formyltoluene.

The phenoplast compound may also be acquired as a commercial product, illustrative examples of which include 26DMPC, 46DMOC, DM-BIPC-F, DM-BIOC-F, TM-BIP-A, BISA-F, BI25X-DF and BI25X-TPA (all from Asahi Organic Chemicals Industry Co., Ltd.).

Of these, both in terms of being able to suppress a decline in the refractive index due to inclusion of a crosslinking agent and also rapid progress of the curing reaction, poly(meth)acrylic compounds are preferred. In particular, owing to their excellent compatibility with triazine ring-containing polymers, poly(meth)acrylic compounds having the isocyanuric acid skeleton shown below are more preferred.

Poly(meth)acrylic compounds having such skeletons are exemplified by NK Ester A-9300 and A-9300-1CL (both available from Shin-Nakamura Chemical Co., Ltd.).

[Chemical Formula 17]

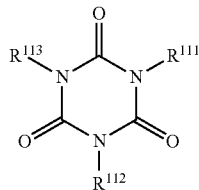

Here, $R^{111}$ to $R^{113}$ are each independently a monovalent organic group having at least one (meth)acrylic group on the end.

To further enhance the rate of cure and also increase the solvent resistance, acid resistance and alkali resistance of the resulting cured film, it is advantageous to use a poly(meth)acrylic compound which at 75° C. is a liquid and has a viscosity of 5,000 mPa·s or less, preferably from 1 to 3,000 mPa·s, more preferably from 1 to 1,000 mPa·s, and even more preferably from 1 to 500 mPa·s (referred to below as a "low-viscosity crosslinking agent), either singly or as a combination of two or more thereof, or in combination with the above-described poly(meth)acrylic compound having an isocyanuric acid skeleton.

Such a low-viscosity crosslinking agent too may be acquired as a commercial product. Examples include, of the above-mentioned poly(meth)acrylic compounds, crosslinking agents in which the chain lengths between (meth)acrylic groups are relatively long, such as NK Ester A-GLY-3E (85 mPa·s at 25° C.), A-GLY-9E (95 mPa·s at 25° C.), A-GLY-20E (200 mPa·s at 25° C.), A-TMPT-3EO (60 mPa·s at 25° C.), A-TMPT-9EO, ATM-4E (150 mPa·s at 25° C.) and ATM-35E (350 mPa·s at 25° C.) (all from Shin-Nakamura Chemical Co., Ltd.).

In addition, to enhance the alkali resistance of the resulting cured film, it is preferable to use a combination of at least one of NK Ester A-GLY-20E (Shin-Nakamura Chemical Co., Ltd.) and NK Ester ATM-35E (Shin-Nakamura Chemical Co., Ltd.) with the above-described poly(meth)acrylic compound having an isocyanuric acid skeleton.

Also, in cases where a thin film made of the triazine ring-containing polymer of the invention is laminated with a protective film such as a PET or polyolefin film and irradiated with light through the protective film, oxygen inhibition does not occur in the laminated thin film, enabling good curability to be achieved. Because there is a need in such cases to peel off the protective film after curing, it is preferable to use a polybasic acid-modified acrylic oligomer that provides a thin film having good peelability.

The above crosslinking agent may be used singly, or two or more may be used in combination. The amount of crosslinking agent used per 100 parts by weight of the triazine ring-containing polymer is preferably from 1 to 100 parts by weight. From the standpoint of solvent resistance, the lower limit is preferably 2 parts by weight, and more preferably 5 parts by weight. From the standpoint of controlling the refractive index, the upper limit is preferably 20 parts by weight, and more preferably 15 parts by weight.

Initiators corresponding to the respective crosslinking agents may also be included in the composition of the invention. As noted above, when a polyepoxy compound and/or a poly(meth)acrylic compound are used as crosslinking agents, photocuring proceeds even without the use of an initiator, giving a cured film, although it is acceptable to use an initiator in such cases.

When a polyepoxy compound is used as the crosslinking agent, a photoacid generator or a photobase generator may be used as the initiator.

The photoacid generator used may be one that is suitably selected from among known photoacid generators. For example, use may be made of onium salt derivatives such as diazonium salts, sulfonium salts or iodonium salts.

Illustrative examples include aryldiazonium salts such as phenyldiazonium hexafluorophosphate, 4-methoxyphenyldiazonium hexafluoroantimonate and 4-methylphenyldiazonium hexafluorophosphate; diaryliodonium salts such as diphenyliodonium hexafluoroantimonate, di(4-methylphenyl)iodonium hexafluorophosphate and di(4-tert-butylphenyl)iodonium hexafluorophosphate; and triarylsulfonium salts such as triphenylsulfonium hexafluoroantimonate, tris(4-methoxyphenyl)sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenylsulfide bishexafluoroantimonate, 4,4'-bis(diphenylsulfonio)phenylsulfide bishexafluorophosphate, 4,4'-bis[di(β-hydroxyethoxy)phenylsulfonio]phenylsulfide bishexafluoroantimonate, 4,4'-bis[di(β-hydroxyethoxy)phenylsulfonio]phenylsulfide bishexafluorophosphate, 4-[4'-(benzoyl)phenylthio]phenyl-di(4-fluorophenyl)sulfonium hexafluoroantimonate and 4-[4'-(benzoyl)phenylthio]phenyl-di(4-fluorophenyl)sulfonium hexafluorophosphate.

Commercial products may be used as these onium salts. Illustrative examples include San-Aid SI-60, SI-80, SI-100, SI-60L, SI-80L, SI-100L, SI-L145, SI-L150, SI-L160, SI-L110 and ST-1147 (all available from Sanshin Chemical Industry Co., Ltd.); UVI 6950, UVI-6970, UVI-6974, UVI-6990 and UVI-6992 (all available from Union Carbide); CPI-100P, CPI-100A, CPI-200K and CPI-200S (all available from San-Apro Ltd.); Adeka Optomer SP-150, SP-151, SP-170 and SP-171 (all available from Adeka Corporation); Irgacure 261 (BASF); CI 2181, CI-2624, CI-2639 and CI-2064 (Nippon Soda Co., Ltd.); CD-1010, CD-1011 and CD-1012 (Sartomer Company); DS-100, DS-101, DAM-101, DAM-102, DAM-105, DAM-201, DSM-301, NAI-100, NAI-101, NAI-105, NAI-106, SI-100, SI-101, SI-105, SI-106, PI-105, NDI-105, BENZOIN TOSYLATE, MBZ-101, MBZ-301, PYR-100, PYR-200, DNB-101, NB-101, NB-201, BBI-101, BBI-102, BBI-103 and BBI-109 (all from Midori Kagaku Co., Ltd.); PCI-061T, PCI-062T, PCI-020T and PCI-0221 (all from Nippon Kayaku Co., Ltd.); and IBPF and IBCF (Sanwa Chemical Co., Ltd.).

The photobase generator used may be one selected from among known photobase generators. For example, use may be made of Co-ammine complex-type, oxime carboxylic acid ester-type, carbamic acid ester-type and quaternary ammonium salt-type photobase generators.

Illustrative examples include 2-nitrobenzylcyclohexyl carbamate, triphenylmethanol, O-carbamoylhydroxylamide, O-carbamoyloxime, [[(2,6-dinitrobenzyl)oxy]carbonyl]cyclohexylamine, bis[[(2-nitrobenzyl)oxy]carbonyl]hexane-1,6-diamine, 4-(methylthiobenzoyl)-1-methyl-1-morpholinoethane, (4-morpholinobenzoyl)-1-benzyl-1-dimethylaminopropane, N-(2-nitrobenzyloxycarbonyl) pyrrolidine, hexaamminecobalt(III) tris(triphenylmethylborate), 2-benzyl-2-dimethylamino-1-(4-morpholinophenyl)butanone, 2,6-dimethyl-3,5-diacetyl-4-(2'-nitrophenyl)-1,4-dihydropyridine and 2,6-dimethyl-3,5-diacetyl-4-(2',4'-dinitrophenyl)-1,4-dihydropyridine.

A commercial product may be used as the photobase generator. Examples include TPS-OH, NBC-101 and ANC-101 (all available under these product names from Midori Kagaku Co., Ltd.).

In cases where a photoacid or photobase generator is used, the amount thereof is preferably in the range of 0.1 to 15 parts by weight, and more preferably 1 to 10 parts by weight, per 100 parts by weight of the polyepoxy compound.

Also, from 1 to 100 parts by weight of an epoxy resin curing agent may be optionally included per 100 parts by weight of the polyepoxy compound.

In cases where a poly(meth)acrylic compound is used, a photoradical initiator may also be used.

A known photoradical initiator may be suitably selected and used for this purpose. Exemplary photoradical initiators include acetophenones, benzophenones, Michler's benzoyl benzoate, amyloxime esters, oxime esters, tetramethyithiuram monosulfide and thioxanthones.

Photocleavable photoradical initiators are especially preferred. Photocleavable photoradical initiators are listed on page 159 of *Saishin UV Kōka Gijutsu* [Recent UV Curing Technology] (publisher, K. Takausu; published by Gijutsu Joho Kyokai KK; 1991).

Examples of commercial photoradical initiators include those available from BASF under the trade names Irgacure 127, 184, 369, 379, 379EG, 651, 500, 754, 819, 903, 907, 784, 2959, CGI1700, CGI1750, CGI1850, CG24-61, OXE01 and OXE02, and the trade names Darocur 1116, 1173 and MBF; that available from BASF under the trade name Lucirin TPO; that available from UCB under the trade name Uvecryl P 36; and those available under the trade names Esacure KIP150, KIP65LT, KIP100F, KT37, KT55, KTO46 and KIP75/B from the Fratelli Lamberti Company.

The photoradical initiator is used in the range of preferably 0.1 to 200 parts by weight, and more preferably 1 to 150 parts by weight, per 100 parts by weight of the poly(meth)acrylate compound.

Ingredients other than the triazine ring-containing polymer, crosslinking agent and solvent may also be included in the inventive composition, provided that doing so does not detract from the advantageous effects of the invention. Examples of such other ingredients include additives such as leveling agents, surfactants, silane coupling agents and inorganic fine particles.

Illustrative examples of surfactants include the following nonionic surfactants: polyoxyethylene alkyl ethers such as polyoxyethylene lauryl ether, polyoxyethylene stearyl ether, polyoxyethylene cetyl ether and polyoxyethylene oleyl ether; polyoxyethylene alkyl aryl ethers such as polyoxyethylene octyl phenyl ether and polyoxyethylene nonyl phenyl ether; polyoxyethylene-polyoxypropylene block copolymers; sorbitan fatty acid esters such as sorbitan monolaurate, sorbitan monopalmitate, sorbitan monostearate, sorbitan monooleate, sorbitan trioleate and sorbitan tristearate; and polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate and polyoxyethylene sorbitan tristearate; and additionally include fluorosurfactants such as those available under the trade names Eftop EF301, EF303 and EF352 (from Mitsubishi Materials Electronic Chemicals Co., Ltd. (formerly Jemco Inc.)), Megafac F171, F173, R-08, R-30, R-40, F-553, F-554, RS-75 and RS-72-K (DIC Corporation), Fluorad FC430 and FC431 (Sumitomo 3M, Ltd.), AsahiGuard AG710 and Surflon S-382, SC101, SC102, SC103, SC104, SC105 and SC106 (Asahi Glass Co., Ltd.); and also the organosiloxane polymers KP341 (Shin-Etsu Chemical Co., Ltd.) and BYK-302, BYK-307, BYK-322, BYK-323, BYK-330, BYK-333, BYK-370, BYK-375 and BYK-378 (BYK-Chemie Japan KK).

These surfactants may be used singly, or two or more may be used in combination. The amount of surfactant used per 100 parts by weight of the triazine ring-containing polymer is preferably from 0.0001 to 5 parts by weight, more preferably from 0.001 to 1 part by weight, and even more preferably from 0.01 to 0.5 part by weight.

Exemplary inorganic fine particles include oxides, sulfides and nitrides of one, two or more metals selected from the group consisting of beryllium, aluminum, silicon, titanium, vanadium, iron, copper, zinc, yttrium, zirconium, niobium, molybdenum, indium, tin, antimony, tantalum, tungsten, lead, bismuth and cerium. Oxides of these metals are especially preferred. The inorganic fine particles may be of a single type used alone, or two or more types may be used in combination.

Illustrative examples of metal oxides include $Al_2O_3$, ZnO, $TiO_2$, $ZrO_2$, $Fe_2O_3$, $Sb_2O_5$, BeO, ZnO, $SnO_2$, $CeO_2$, $SiO_2$ and $WO_3$.

It is also effective to use a plurality of metal oxides as a mixed oxide. Mixed oxides refer to two or more inorganic oxides that have been mixed together at the fine particle production stage. Illustrative examples include mixed oxides of $TiO_2$ and $ZrO_2$, mixed oxides of $TiO_2$ and $ZrO_2$ and $SnO_2$, and mixed oxides of $ZrO_2$ and $SnO_2$.

In addition, compounds of the above metals may be used. Examples of such compounds include $ZnSb_2O_6$, $BaTiO_3$, $SrTiO_3$ and $SrSnO_3$. Such compounds may be used singly, two or more may be used in admixture, or such compounds may be used in admixture with the above oxides.

The other ingredients mentioned above may be added in any step during preparation of the inventive composition.

The solids concentration within the film-forming composition of the invention is not particularly limited, provided it is within a range that does not affect the ink-jet coatability, and may be suitably set according to, for example, the ink-jet coater to be used and the thickness of the desired film. Specifically, the solids concentration is preferably from 1 to 40 wt %, more preferably from 5 to 30 wt %, and even more preferably from 10 to 25 wt %.

The viscosity of the film-forming composition at 25° C., from the standpoint of the ink-jet coatability, is preferably from 5 to 35 mPa·s, more preferably from 5 to 25 mPa·s, and even more preferably from 5 to 20 mPa·s.

The surface tension of the film-forming composition, from the standpoint of the ink-jet coatability, is preferably from 15 to 40 mN/m, and more preferably from 20 to 35 mN/m.

The film-forming composition of the composition may be rendered into the desired thin film or cured film by ink-jet coating the composition onto a substrate using an ink-jet coater, then optionally heating to evaporate off the solvent, followed by heating or light irradiation.

The ink-jet coater is not particularly limited, and may be suitably selected and used from among hitherto known ink-jet coaters.

Illustrative examples of the substrate include substrates made of silicon, indium tin oxide (ITO)-coated glass, indium zinc oxide (IZO)-coated glass, polyethylene terephthalate (PET), plastic, glass, quartz or ceramic. Use can also be made of a flexible substrate having pliability.

The bake temperature for evaporating off the solvent is not particularly limited. The bake may be carried out at, for example, from 110 to 400° C.

The bake process is not particularly limited. For example, evaporation may be effected using a hot plate or an oven, such evaporation being carried out under a suitable atmosphere, such as in open air, in nitrogen or another inert gas, or in a vacuum.

With regard to the bake temperature and time, conditions which are compatible with the processing steps for the target electronic device should be selected. Bake conditions should be selected in such a way that the physical values of the resulting film conform to the required characteristics of the electronic device.

The conditions in cases where light irradiation is carried out are also not particularly limited. For example, an irradiation energy and time which are suitable for the triazine ring-containing polymer and crosslinking agent used may be employed.

The thin films and cured films of the invention obtained in the above manner are able to attain a high heat resistance, high refractive index and low volume shrinkage, and therefore can be suitably utilized in the fields of electronic devices and optical materials as, for example, components in the fabrication of liquid-crystal displays, organic electroluminescent (EL) displays, touch panels, photosemiconductor (LED) devices, solid-state image sensors, organic thin-film solar cells, dye-sensitized solar cells, organic thin-film transistors (TFTs), lenses, prisms, cameras, binoculars, microscopes, semiconductor steppers and the like.

In particular, because thin films and cured films produced from the inventive composition have a high transparency and also have a high refractive index, the visibility of transparent conductive films made of ITO or silver nanowires can be improved and the deterioration of transparent conductive films can be inhibited.

The transparent conductive film is preferably an ITO film, an IZO film, or a transparent conductive film having electrically conductive nanostructures such as metal nanoparticles, metal nanowires or metal nanomeshes. A transparent conductive film having electrically conductive nanostructures is more preferred. The metal making up the conductive nanostructures is not particularly limited. Examples include silver, gold, copper, nickel, platinum, cobalt, iron, zinc, ruthenium, rhodium, palladium, cadmium, osmium, iridium, and alloys thereof. That is, a transparent conductive film having, for example, silver nanoparticles, silver nanowires, silver nanomeshes, gold nanoparticles, gold nanowires, gold nanomeshes, copper nanoparticles, copper nanowires or copper nanomeshes is preferred. A transparent conductive film having silver nanowires is especially preferred.

EXAMPLES

Working Examples and Comparative Examples are given below to more concretely illustrate the invention, although the invention is not limited by these Examples. The instruments used in the Examples were as follows.

[GPC]

Instrument: HLC-8200 GPC, from Tosoh Corporation

Columns: Shodex® GPC KF-804L+KF-805L (from Showa Denko KK)

Column temperature: 40° C.

Solvent: Tetrahydrofuran (THF)

Detector: UV (254 nm)

Calibration curve: polystyrene standard

[Ellipsometer]

Instrument: VASE multiple incident angle spectroscopic ellipsometer (JA Woollam Japan)

[Thermogravimetric/Differential Thermal Analyzer (TG-DTA)]

Instrument: TG-8120 (Rigaku Corporation)

Temperature rise rate: 10° C./min

Measurement temperatures: 25° C. to 750° C.

[Ink-Jet System]

Instrument: Inkjet Designer, from Cluster Technology Co., Ltd.

Driver: Wave Builder32® PIJD-1SET, from Cluster Technology Co., Ltd.

Head: Pulse Injector® PIJ-60ASET (nozzle diameter, 60 μm), from Cluster Technology Co., Ltd.

[Viscosity]

Instrument: Type E viscometer (Viscometer TV-22, from Told Sangyo Co., Ltd.)

[Surface Tension]
Instrument: CBVP-Z automatic surface tensiometer, from Kyowa Interface Science Co., Ltd.

[1] Synthesis of Triazine Ring-Containing Polymer

[Synthesis Example 1] Synthesis of Polymeric Compound [3]

[Chemical Formula 18]

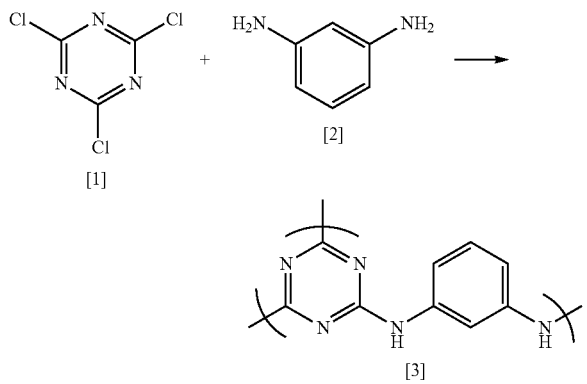

Under nitrogen, 456.02 g of N,N-dimethylacetamide (DMAc) was added to a 1,000 mL four-neck flask and cooled to −10° C. in an acetone-dry ice bath, following which 2,4,6-trichloro-1,3,5-triazine (84.83 g, 0.460 mol; Evonik Degussa) was added and dissolved. Next, m-phenylenediamine (62.18 g, 0.575 mol) dissolved in 304.01 g of DMAc, and aniline (14.57 g, 0.156 mol) were added dropwise. Following dropwise addition, the system was stirred for 30 minutes and the reaction solution was then added dropwise over a period of 1 hour via a fluid delivery pump to a 2,000 mL four-neck flask already containing 621.85 g of DMAc and heated beforehand on an oil bath to 85° C., and polymerization was carried out for 1 hour under stirring.

Next, aniline (113.95 g, 1,224 mol) was added and the flask contents were stirred for 1 hour, bringing the reaction to completion. The system was cooled to room temperature in an ice bath, after which triethylamine (116.36 g, 1.15 mol) was added dropwise and 30 minutes of stirring was carried out, thereby quenching the hydrochloric acid. The precipitated hydrochloride was subsequently removed by filtration. The filtered reaction solution was re-precipitated in a mixed solution of 28% ammonia water (279.29 g) and 8,820 g of deionized water. The precipitate was filtered, dried at 150° C. for 8 hours in a vacuum desiccator, and then re-dissolved in 833.1 g of THF and re-precipitated in 6,665 g of deionized water. The resulting precipitate was filtered, then dried in a vacuum desiccator at 150° C. for 25 hours, giving 118.0 g of the target polymeric compound [3] (abbreviated below as "HB-TmDA40").

The HB-TmDA had a weight-average molecular weight Mw, as measured by GPC (solvent, THF) and calibrated against a polystyrene standard, of 4,300, and the polydispersity Mw/Mn was 3.44.

(1) Heat-Resistance Test

TG-DTA measurement was carried out on the HB-TmDA40 obtained in Synthesis Example 1, whereupon the 5% weight loss temperature was 419° C.

(2) Refractive Index Measurement

A clear, light-yellow solution was obtained by dissolving 0.5 g of the HB-TmDA40 obtained in Synthesis Example 1 in cyclohexanone (4.5 g). Using a spin coater, the resulting polymer varnish was spin-coated onto a glass substrate at 200 rpm for 5 seconds and at 2,000 rpm for 30 seconds, following which the solvent was removed by heating at 150° C. for 1 minute and at 250° C. for 5 minutes, giving a film. The refractive index of the resulting film was measured, whereupon the refractive index at 550 nm was 1.790.

An amount of 30 g of the HB-TmDA40 obtained in Synthesis Example 1 was added to and stirred in 70 g of, respectively, diethylene glycol dimethyl ether (DEGDME) as a solitary solvent, a mixed solvent of DEGDME/diethylene glycol (DEG)=70/30 (weight ratio) and a mixed solvent of DEGDME/propylene glycol monomethyl ether (PGME)=70/30 (weight ratio), thereby giving clear, uniform solutions. The solubility in the respective solvents, and the viscosity at 23° C. and surface tension in the respective solvents were measured. The results are shown in Table 1. The solubility evaluation criteria were as follows.

Good: ◉
Acceptable: ○

TABLE 1

| Solvent | Solubility | Viscosity (mPa · s) | Surface tension (mN/m) |
|---|---|---|---|
| DEGDME | ◉ | 5 | 29.5 |
| DEGDME/DEG | ○ | 15 | 30.2 |
| DEGDME/PGME | ○ | 5 | 28.9 |

[2] Preparation of Film-Forming Composition for Ink-Jet Coating

Working Example 1-1

A varnish having a solids concentration of 15 wt % (abbreviated below as HB-TmDA40V1) was prepared by adding and stirring together 12.39 g of a solution of HB-TmDA40 (30 g) dissolved in 70 g of DEGDME, 0.37 g of the polyacrylate AT-20E (from Shin-Nakamura Chemical Co., Ltd.), 0.11 g of polyacrylate ATM-35E (also from Shin-Nakamura Chemical Co., Ltd.), 0.30 g of a photoradical initiator (Irgacure 184, from BASF), and 0.372 g of a 1 wt % DEGDME solution of a pre-prepared surfactant (Megafac R-40, from DIC Corporation), and then adding 8.81 g of DEGDME and 7.65 g of DEG and visually confirming dissolution.

The HB-TmDA40V1 varnish had a viscosity at 23° C. of 13.3 mPa·s, and a surface tension of 30.5 mN/m.

Using a spin coater, the HB-TmDA40V1 varnish was spin-coated onto a soda-lime glass substrate at 200 rpm for 5 seconds and at 1,000 rpm for 30 seconds, following which a 3-minute bake at 120° C. was carried out on a hot plate. The applied varnish was then cured under atmosphere pressure with a high-pressure mercury vapor lamp at a cumulative exposure dose of 200 mJ/cm$^2$, thereby giving a cured film having a film thickness of 645 nm. The resulting cured film had a refractive index at 550 nm of 1.752.

Using an ink-jet system, the HB-TmDA40V1 varnish was discharged onto soda-lime glass under the following conditions: driving waveform, C; repetition frequency, 1 kHz. Good ejection of the droplets was observed, and erosion or deterioration of the head by the solvent used was not observed. The driving voltage was adjusted in such a way that bending of the droplet trajectory does not arise while the flight of the droplets is being observed.

The invention claimed is:

1. A film-forming composition for ink-jet coating, comprising:

a triazine ring-containing polymer containing a recurring unit structure of formula (1) below

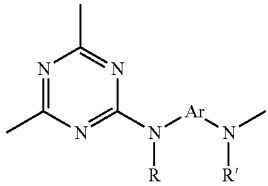

(1)

wherein R and R' are each independently a hydrogen atom, an alkyl group, an alkoxy group, an aryl group or an aralkyl group; and Ar is at least one moiety selected from the group consisting of moieties of formulas (2) to (13)

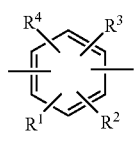

(2)

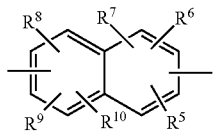

(3)

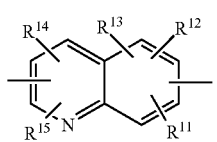

(4)

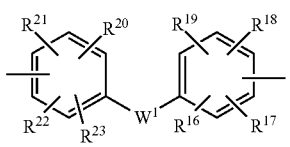

(5)

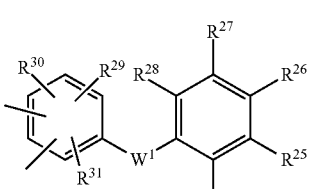

(6)

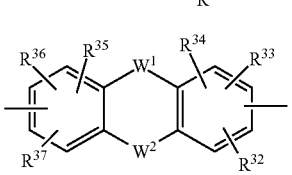

(7)

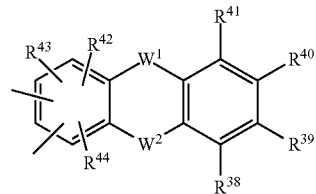

(8)

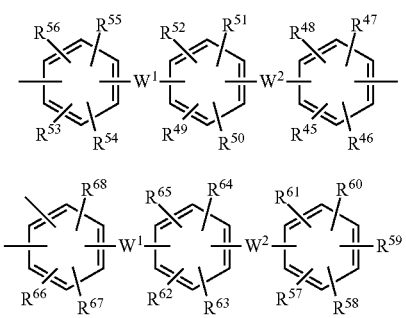

(9)

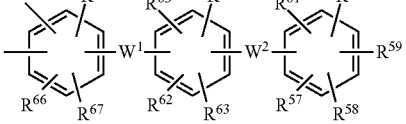

(10)

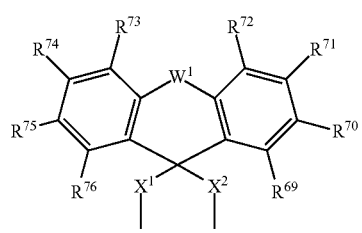

(11)

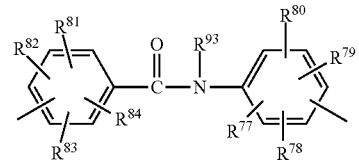

(12)

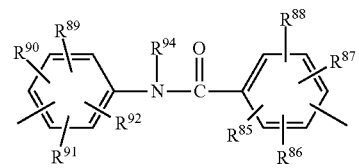

(13)

wherein $R^1$ to $R^{92}$ are each independently a hydrogen atom, a halogen atom, a carboxyl group, a sulfo group, an alkyl group of 1 to 10 carbon atoms which may have a branched structure, or an alkoxy group of 1 to 10 carbon atoms which may have a branched structure;

$R^{93}$ and $R^{94}$ are each a hydrogen atom or an alkyl group of 1 to 10 carbon atoms which may have a branched structure;

$W^1$ and $W^2$ are each independently a single bond, $CR^{95}R^{96}$ (wherein $R^{95}$ and $R^{96}$ are each independently a hydrogen atom or an alkyl group of 1 to 10 carbon atoms which may have a branched structure, and $R^{95}$ and $R^{96}$ may together form a ring), C=O, O, S, SO, $SO_2$ or $NR^{97}$ ($R^{97}$ being a hydrogen atom or an alkyl group of 1 to 10 carbon atoms which may have a branched structure); and $X^1$ and $X^2$ are each independently a single bond, an alkylene group of 1 to 10 carbon atoms which may have a branched structure, or a group of formula (14)

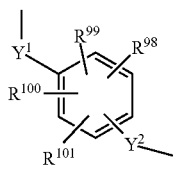

(14)

wherein $R^{98}$ to $R^{101}$ are each independently a hydrogen atom, a halogen atom, a carboxyl group, a sulfo group, an alkyl group of 1 to 10 carbon atoms which may have a branched structure, or an alkoxy group of 1 to 10 carbon atoms which may have a branched structure; and $Y^1$ and $Y^2$ are each independently a single bond or an alkylene group of 1 to 10 carbon atoms which may have a branched structure, and an organic solvent containing a glycol dialkyl ether solvent and one or both of a glycol monoalkyl ether solvent and a glycol solvent, wherein the glycol dialkyl ether solvent is contained in a proportion of more than 50 wt % in the organic solvent, and the weight A of the glycol dialkyl ether solvent and the combined weight B of the glycol monoalkyl ether solvent have a ratio A:B therebetween of from 99:1 to 51:49.

2. The film-forming composition for ink-jet coating of claim 1, wherein the glycol dialkyl ether solvent is a diethylene glycol dialkyl ether.

3. The film-forming composition for ink-jet coating of claim 2, wherein the diethylene glycol dialkyl ether is diethylene glycol dimethyl ether.

4. The film-forming composition for ink-jet coating of claim 1, wherein the glycol monoalkyl ether solvent is a propylene glycol monoalkyl ether.

5. The film-forming composition for ink-jet coating of claim 4, wherein the propylene glycol monoalkyl ether is propylene glycol monomethyl ether.

6. The film-forming composition for ink-jet coating of claim 1, wherein the glycol solvent is diethylene glycol.

7. The film-forming composition for ink-jet coating of claim 1, further comprising a crosslinking agent.

8. The film-forming composition for ink-jet coating of claim 7, wherein the crosslinking agent is a poly(meth)acrylic compound.

9. The film-forming composition for ink-jet coating of claim 1 which has a surface tension of from 25 to 35 mN/m.

10. The film-forming composition for ink-jet coating of claim 1 which has a viscosity at 23° C. of from 5 to 20 mPa·s.

11. A film forming method which forms a film by ink-jet coating the film-forming composition of claim 1.

12. A film obtained by the method of claim 11.

13. An electronic device comprising a substrate and the film of claim 12 formed on the substrate.

14. An optical member comprising a substrate and the film of claim 12 formed on the substrate.

* * * * *